June 24, 1930.    H. E. WARREN    1,768,386
MOTOR ROTOR
Filed Sept. 25, 1929

Inventor:
Henry E. Warren,
by Charles E. Tullar
His Attorney.

Patented June 24, 1930

1,768,386

UNITED STATES PATENT OFFICE

HENRY E. WARREN, OF ASHLAND, MASSACHUSETTS, ASSIGNOR TO WARREN TELE-CHRON COMPANY, OF ASHLAND, MASSACHUSETTS, A CORPORATION OF MAINE

MOTOR ROTOR

Application filed September 25, 1929. Serial No. 395,160.

My invention relates to the rotor structures of self-starting synchronous motors and in particular to the means for securing the rotor structure to the shaft in a very simple manner with the aim of reducing the cost of manufacture and assembly.

In the type of self-starting synchronous motor described in my United States Patent No. 1,546,269, July 14, 1925, the rotor comprises one or more continuous rings of magnetic material provided with an integral bar across the diameter. The continuous outer ring cooperates with a rotating magnetic field to produce starting torque and the bar produces a polar synchronizing effect to bring the rotor into and hold it in synchronism. The bar across the diameter also serves as the rotor spider and has heretofore been provided with an accurate central opening fitting the motor shaft. The rotor to which my invention relates is magnetically similar to the bar rotor of my previous patent referred to above but differs in that the single bar is replaced by two bars proportioned to embrace the shaft and hold the rotor in place thereon by the spring action of the bars. This simple modification has brought about a material reduction in the cost of manufacture and assembly of the parts.

Figure 1:
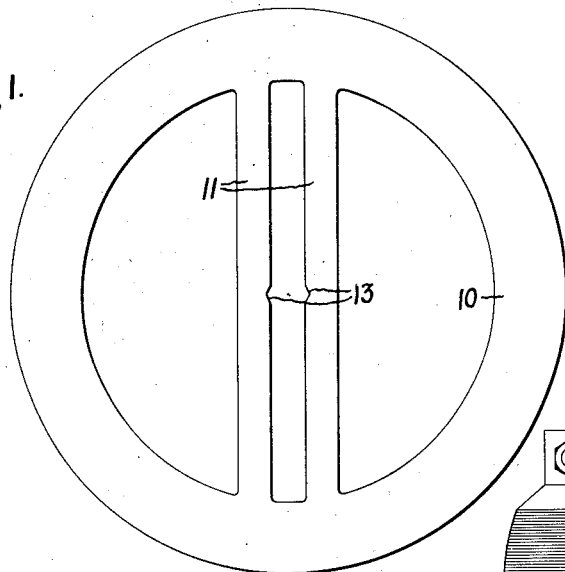
Figure 5:
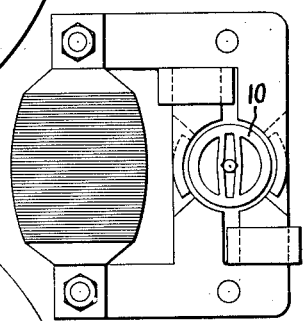
Figure 2:
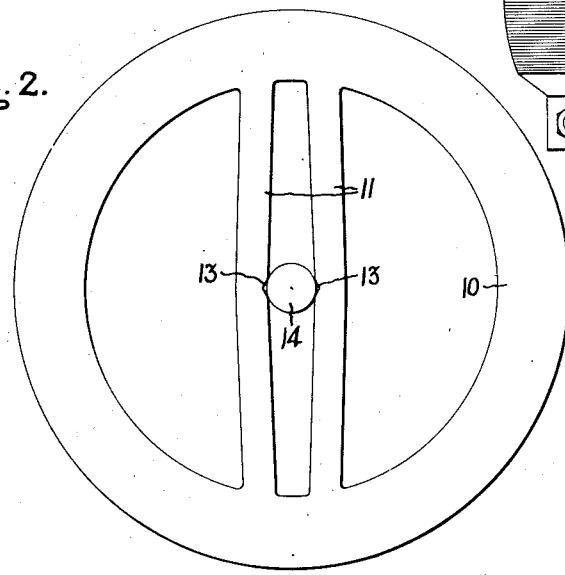
Figure 3:
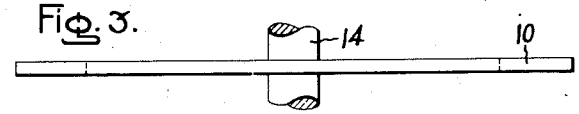
Figure 4:
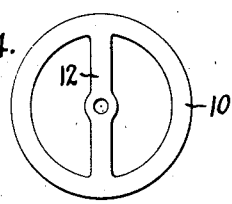

The features of my invention which are believed to be novel and patentable will be pointed out in the claims appended hereto. For a better understanding of the invention reference is made in the following description to the accompanying drawing in which Figs. 1 and 2 represent plan views of my improved rotor before and after assembly on the rotor shaft; Fig. 3 represents a side or edge view of the rotor as assembled on the shaft; Fig. 4 represents a rotor similar to that described in my previous patent; and Fig. 5 represents a complete motor equipped with the rotor of the present invention.

In Fig. 1, I have shown a plan view of the new rotor prior to assembly on the shaft. The entire rotor is stamped from sheet steel or other suitable permanent magnet material in one operation and in the usual commercial form has about the external dimensions of a dime. The continuous outer ring 10 is the starting element and the double bar 11 across the ring is the synchronizing element of the rotor when subjected to a rotating magnetic field.

Prior to the present invention rotors which were magnetically similar to the rotor of the present invention were made with a single bar 12 across the diameter in the manner represented in Fig. 4. In the two types of rotors the material extending across the diameter serves as the rotor spider and supports the rotor on the shaft. With the rotor of Fig. 4 the bar 12 is provided with a central opening 13 exactly dimensioned to give a tight fit over the rotor shaft. The adjacent or hub portion of the bar was enlarged to properly dimension the parts magnetically and mechanically. It will be understood that the rotor was not keyed to the shaft but depended solely upon a tight fit between the central opening and shaft for the driving connection. With such an arrangement it was of course necessary to maintain the dimensions of shaft and shaft opening within very accurate limits. To maintain the required degree of accuracy with these small parts is tedious and costly and a certain amount of wasted material due to inaccuracies is inevitable.

According to the new arrangement the bars 11 are merely notched opposite each other at the center as indicated at 13 during the stamping operation and the two bars are sprung apart slightly and slipped over the shaft 14 with the notches 13 engaging the shaft as shown in Fig. 2. The two halves of the double bar are now under tension and act as springs to firmly grasp the shaft 14. Nicety of fit is no longer required since slight irregularities in the spacing of sections of the double bar 14, the depth and shape of the notches 13, or the diameter of the shaft 14, are of no consequence so long as the spring arms grasp the shaft with sufficient force to maintain a driving connection between the rotor spider and shaft. The torque of this type of motor is small and the elastic clamping action thus obtained between rotor and shaft is ample to convey the torque without slipping. The rotors with the double spring bar may be assembled and adjusted to the correct position on the shaft by hand and any amount of adjustment does not destroy the necessary frictional driving contact between rotor and shaft. The notches 13 are primarily for the purpose of accurately centering the shaft in the rotor. The notches also increase the frictional contacting surface between rotor and shaft somewhat but it is quite unnecessary to have the contour of the notch fit the contour of the shaft. The new rotor as assembled in a complete motor is represented in Fig. 5. The new rotor is therefore of such construction that it may be stamped from sheet metal in one operation with ordinary press punch machines arranged for quantity production and without especial attention to the accuracy of the dies. It is no longer necessary to hold the diameter of the rotor shaft to an exact dimension. These features, together with the ease of assembly and adjustment of the new rotor, correspondingly reduce the cost of the motor. The construction as described is primarily intended for securing the rotor of the self-starting synchronous motor to the shaft. However it is believed that the same construction will be advantageous in many other applications and where such other applications are within the true spirit and scope of the invention they are intended to be included in the invention as claimed.

What I claim as new and desire to secure by Letters Patent of the United States is:

1. A rotor for self starting synchronous motors comprising a ring of magnet steel and a double bar across its diameter integral with the ring serving the purpose of a resilient hub for the rotor.

2. A rotor for self starting synchronous motors comprising a ring of magnet steel and a double bar across its diameter integral with the ring, and a shaft for said rotor resiliently embraced between the sections of said double bar.

3. A rotor for self starting synchronous motors comprising a ring of magnet steel, a pair of substantially parallel bars integral with said ring forming a magnetic path across a diameter of said rotor, the adjacent surfaces of said bars being notched at the center, and a shaft for said rotor resiliently embraced between the notched portions of said bars.

4. A one piece rotor for self starting synchronous motors, said rotor being stamped from a piece of sheet steel and comprising a ring with a double bar across a diameter thereof, the sections of the double bar being spaced apart and notched on their adjacent surfaces at the center, and a shaft for the rotor resiliently embraced between the notched portions of said double bar.

5. A self starting synchronous motor comprising a stator portion for producing a rotating magnetic field, and a rotor portion comprising a flat ring of sheet steel having a double bar integral with the ring extending across a diameter thereof, and a shaft for said rotor resiliently grasped between the sections of the double bar at the center of the rotor.

6. A rotor member for rotating apparatus comprising a ring portion and a spider portion, the spider portion comprising a pair of resilient substantially parallel bars extending across said ring portion equally spaced from the center thereof in the plane of the ring, and a shaft for said rotor resiliently grasped between said arms at their centers.

In witness whereof, I have hereunto set my hand this 21st day of Sept., 1929.

HENRY E. WARREN.